(12) United States Patent
Kim et al.

(10) Patent No.: US 8,964,561 B2
(45) Date of Patent: Feb. 24, 2015

(54) METHOD AND APPARATUS FOR SIGNALING SEQUENCE ROOT

(75) Inventors: Taejoon Kim, Berkeley, CA (US);
Sayantan Choudhury, Berkeley, CA (US); Klaus F. Doppler, Albany, CA (US); Chittabrata Ghosh, Union City, CA (US); Zhong-Yi Jin, Albany, CA (US); Esa Tuomaala, Helsinki (FI)

(73) Assignee: Nokia Corporation, Espoo (FI)

( * ) Notice: Subject to any disclaimer, the term of this patent is extended or adjusted under 35 U.S.C. 154(b) by 155 days.

(21) Appl. No.: 13/464,213

(22) Filed: May 4, 2012

(65) Prior Publication Data
US 2013/0294427 A1 Nov. 7, 2013

(51) Int. Cl.
*H04W 4/20* (2009.01)

(52) U.S. Cl.
USPC .......................... 370/236; 370/328; 370/522

(58) Field of Classification Search
USPC ......... 370/229, 236, 310, 328, 338, 341, 389, 370/395.4, 410, 449, 496, 522
See application file for complete search history.

(56) References Cited

U.S. PATENT DOCUMENTS

| 8,493,887 | B2 * | 7/2013 | Palanki et al. | 370/254 |
| 2005/0138199 | A1 * | 6/2005 | Li et al. | 709/236 |
| 2006/0083197 | A1 | 4/2006 | Kang | 370/329 |
| 2009/0092148 | A1 * | 4/2009 | Zhang et al. | 370/458 |
| 2010/0232318 | A1 * | 9/2010 | Sarkar | 370/254 |
| 2011/0158104 | A1 * | 6/2011 | Frenger et al. | 370/241 |

FOREIGN PATENT DOCUMENTS

| WO | WO-2008/111808 A1 | 9/2008 |
| WO | WO-2009/149760 A1 | 12/2009 |
| WO | WO-2010/071561 A1 | 6/2010 |

OTHER PUBLICATIONS

Draft P802.11-REVmb/D6.0, (Sep. 2010), "Local and Metropolitan Area Networks—Specific Requirements", Chapter 8, (244 pages).

* cited by examiner

*Primary Examiner* — Curtis A Alia
(74) *Attorney, Agent, or Firm* — Harrington & Smith

(57) ABSTRACT

A first access node of a first network utilizes code sequences, assigned to different user devices, to distinguish at least acknowledgements received in parallel or sequentially from those user devices. The first access node determines from received signaling that a root sequence of the code sequences is in use by a second access node of a second network, then changes that root sequence of the code sequences assigned to the different user devices. In certain examples the access nodes are WLAN access points APs and the acknowledgements are received in response to a group probe/poll. In various embodiments the first AP monitors its neighbors' group probes/polls to learn the root sequences/basic service sets in use in those neighbor networks, or the AP's own stations monitor and send the information in neighbor reports. This latter option can be initiated by the stations themselves, or by the AP.

15 Claims, 8 Drawing Sheets

| INFORMATION ELEMENT | FRAME CONTROL | DA | TA | BSSID |
|---|---|---|---|---|
| | | DESTINATION ADDRESS (BC/MC) | MAC ID OF AP | BSSID OF NETWORK |
| BITS (OCTS) | 32 (4) | 48 (6) | 48 (6) | 48 (6) |
| INFORMATION ELEMENT | NUMBER GROUPS | GROUP ID | TRANSMIT POWER OF AP | TARGET POWER FOR ACK |
| | NUMBER OF GROUPS POLLED BY THIS PROBE (N) | ID OF GROUP POLLED | TRANSMIT POWER CLASS OF AP | TARGET POWER FOR ACK MESSAGES |
| BITS | 3 | Nx8 (N) | 4 | 4 |
| INFORMATION ELEMENT | NEXT PROBE FOR GROUP | NEXT L PROBES | CRC | |
| | GROUP WILL BE POLLED AGAIN IN K INTERVALS | ID OF GROUP POLLED IN NEXT L INTERVALS | CYCLIC REDUNDANCY CHECK | |
| BITS | Nx8 (N) | 8+NxLx8 (1+N*L) | 32 (4) | |

FIG.2

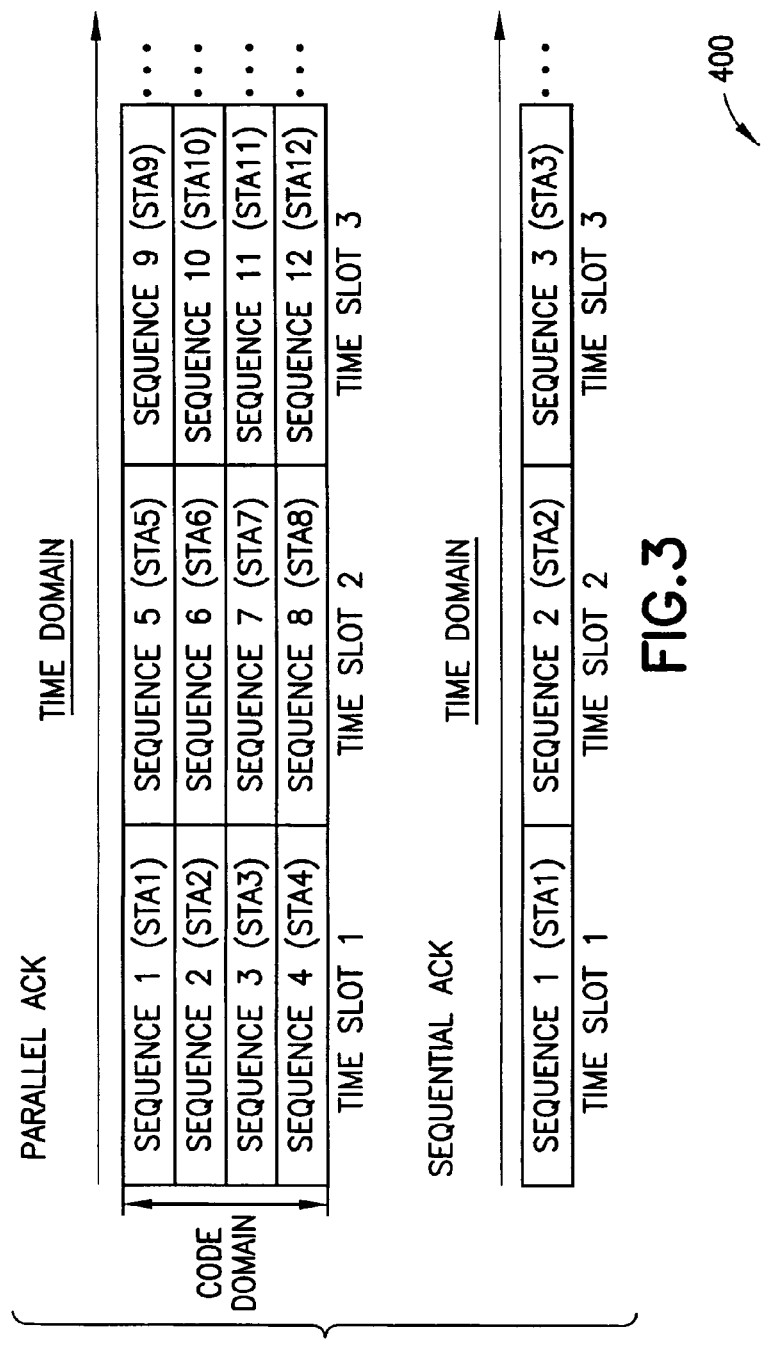

| INFORMATION ELEMENT | BITS (OCTETS) | DESCRIPTIONS |
|---|---|---|
| FC | 32 (4) | FRAME CONTROL: ANY RESERVED CONTROL FRAME TYPE/SUBTYPE CAN BE USED |
| RA | 48 (6) | ADDRESS OF AP RECEIVING SEQUENCE USAGE REPORT FROM STA |
| TA | 48 (6) | ADDRESS OF STA TRANSMITTING THE SEQUENCE USAGE REPORT |
| SEQUENCE USAGE | (7*N) | MULTIPLE PAIRS OF BSSID AND SEQUENCE ROOT VALUE FOR SCANNED N BSSs |
| FCS | 32 (4) | FRAME CHECK SUM |

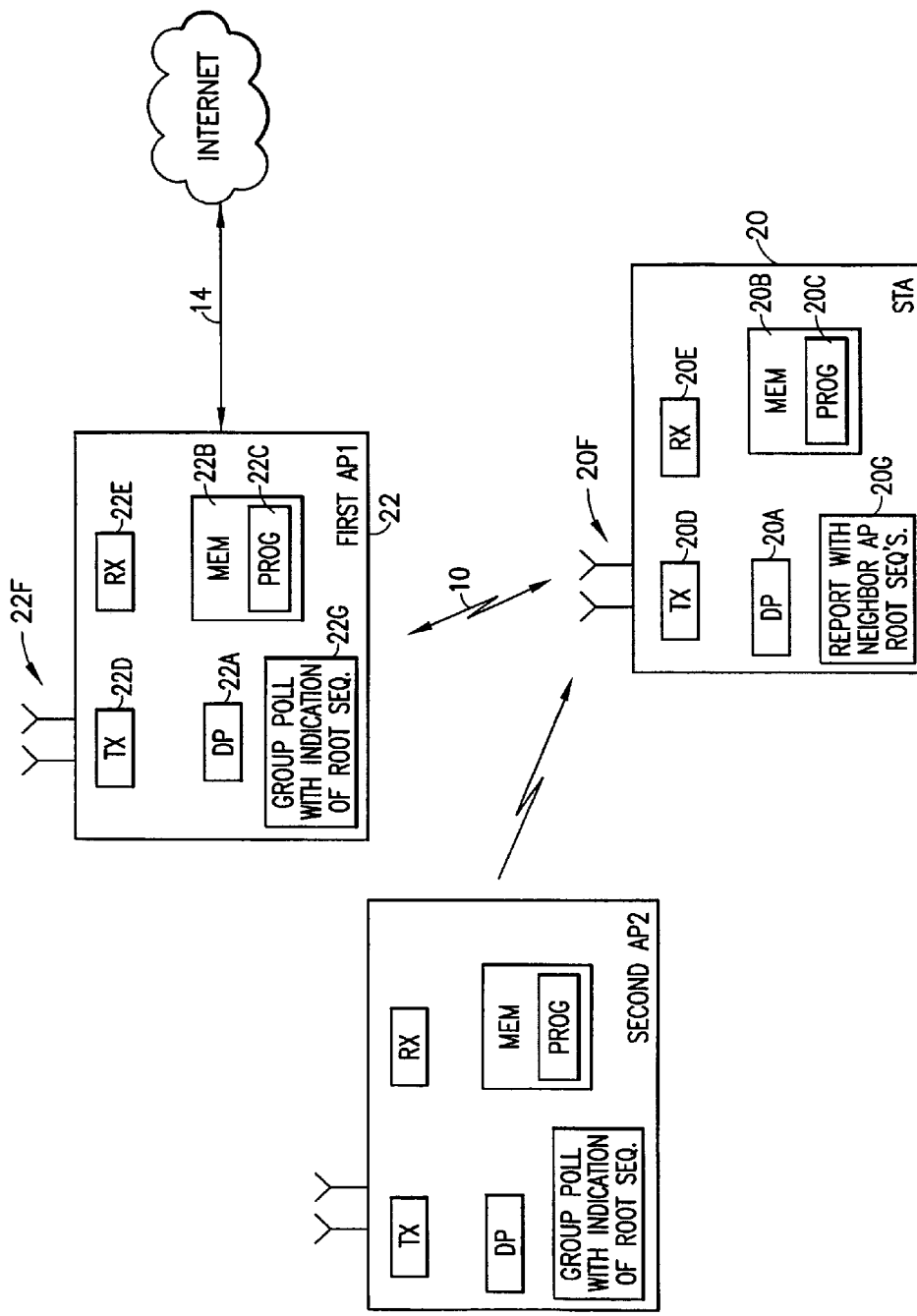

METHOD AND APPARATUS FOR SIGNALING SEQUENCE ROOT

TECHNICAL FIELD

This invention relates generally to wireless communications, and more specifically is directed toward signaling for avoiding conflict in messages from different user devices.

BACKGROUND

Wireless communication systems are now very widely deployed and in recent years have been adapted to handle greater volumes and varieties of data. This has led to the available radio spectrum becoming scarce. To improve efficiency or data throughput in wireless systems, the volume of control data has been reduced to leave more spectrum available for user/substantive data. One competing design criteria to maximize throughput is to assure there is no ambiguity when data is transmitted the first time, to avoid the need to re-transmit the same data again. In some radio access technologies an acknowledgement ACK that a radio device has correctly received some particular data block are distinguishable in the time domain from other devices' similar ACKs, for example if the timeslot for sending an ACK is tightly mapped to the timeslot in which the corresponding data block was sent. This mapping saves on control overhead because the ACK itself does not need to be increased in size to explicitly identify the particular device that sent it. But ACKs are not only for data so this time domain distinction may not always be available.

In other ACK signaling techniques the ACKs from multiple devices are sent in parallel in a same frequency band. The receiver of those parallel ACKs still needs to distinguish them from one another so it can know which device if any failed to properly receive the information being ACK'd. Time domain mapping as in the above example is no longer possible with parallel ACKs, and frequency domain mapping is not available when the parallel ACKs are in the same channel. User radio devices such as mobile terminals in a cell are assigned temporary identifiers (IDs) which are much shorter than the globally-unique universal subscriber identity and are also intended to be unique in at least the cell. But even temporary cell IDs are a bit large to append to every ACK signaling instance, since the ACK information itself may be as small as two or even one bit.

When considering the licensed radio spectrum, adjacent cells may coordinate with one another to assure both cells do not use a same temporary ID for different users, else one cell might receive signaling from a user within the adjacent cell but near the cell edge and mistakenly conclude it originated from a user in its own cell. This coordination is not always available for radio operations in the unlicensed band, where one ad hoc network might not be aware of all the other nearby local networks. What is needed is a spectrum efficient way to distinguish parallel signaling so the receiving party can know exactly which devices sent it and which did not. Preferably this spectrum efficient way would be valid for both licensed and unlicensed radio spectrum.

SUMMARY

According to a first exemplary aspect the invention there is a method comprising: utilizing at a first access node of a first network code sequences assigned to different user devices to distinguish at least acknowledgements from the user devices that are received in parallel or sequentially; determining from signaling received at the first access node of the first network that a root sequence of the code sequences is in use by a second access node of a second network; and thereafter changing the root sequence of the code sequences assigned to the different user devices.

According to a second exemplary aspect the invention there is an apparatus comprising: at least one processor and at least one memory including computer program code. In this aspect the at least one memory and the computer program code are configured, with the at least one processor and in response to execution of the computer program code, to cause the apparatus to perform at least: utilizing at a first access node of a first network code sequences assigned to different user devices to distinguish at least acknowledgements from the user devices that are received in parallel or sequentially; determining from signaling received at the first access node of the first network that a root sequence of the code sequences is in use by a second access node of a second network; and thereafter changing the root sequence of the code sequences assigned to the different user devices.

According to a third exemplary aspect the invention there is a computer readable memory storing a program of instructions which when executed by at least one processor result in actions comprising: utilizing at a first access node of a first network code sequences assigned to different user devices to distinguish at least acknowledgements from the user devices that are received in parallel or sequentially; determining from signaling received at the first access node of the first network that a root sequence of the code sequences is in use by a second access node of a second network; and thereafter changing the root sequence of the code sequences assigned to the different user devices.

According to a fourth exemplary aspect the invention there is a method comprising: utilizing a code sequence to distinguish at least an acknowledgement, sent from a first user device to a first access node of a first network, from at least other acknowledgements that may be sent by other user devices in parallel or sequentially; from signaling received at the first user device, determining a root sequence in use by a second access node of a second network; and thereafter compiling an uplink message for informing the first access node of the root sequence in use by the second access node.

According to a fifth exemplary aspect the invention there is an apparatus comprising: at least one processor and at least one memory including computer program code. In this aspect the at least one memory and the computer program code are configured, with the at least one processor and in response to execution of the computer program code, to cause the apparatus to perform at least: utilizing a code sequence to distinguish at least an acknowledgement, sent from a first user device to a first access node of a first network, from at least other acknowledgements that may be sent by other user devices in parallel or sequentially; from signaling received at the first user device, determining a root sequence in use by a second access node of a second network; and thereafter compiling an uplink message for informing the first access node of the root sequence in use by the second access node.

According to a sixth exemplary aspect the invention there is a computer readable memory storing a program of instructions which when executed by at least one processor result in actions comprising: utilizing a code sequence to distinguish at least an acknowledgement, sent from a first user device to a first access node of a first network, from at least other acknowledgements that may be sent by other user devices in parallel or sequentially; from signaling received at the first user device, determining a root sequence in use by a second access node of a second network; and thereafter compiling an uplink message for informing the first access node of the root sequence in use by the second access node.

BRIEF DESCRIPTION OF THE DRAWINGS

FIG. 2 illustrates in tabular form certain information elements of a CF group poll such as that shown at FIG. 1B.

FIG. 3 illustrates exemplary time slot structures for parallel (top) and sequential (bottom) ACK messages from different STAs for the ACKs shown at FIG. 1B, according to an exemplary embodiment of these teachings.

FIG. 4 illustrates a non-limiting example of a new information element to be added to the CF group poll message to indicate the Zadoff-Chu (or other sequence) in use for that group according to an exemplary embodiment of these teachings.

FIG. 8 is a simplified block diagram of two STAs and an AP which are exemplary devices suitable for use in practicing the exemplary embodiments of the invention.

DETAILED DESCRIPTION

In order to conserve power in portable devices such as user equipments in cellular network systems and stations in wireless local access network (WLAN) systems, these portable devices switch between an active state and a sleep state. Different radio access technologies have different terms for these active and sleep states, but in general during the active state the portable devices may be sending or receiving data or merely monitoring to see if there is any data scheduled to be sent to them, while during the sleep state the device has the option to go into a low power or idle mode during which its monitoring activity is greatly reduced or eliminated. The sleep state is interrupted at periodic intervals so the portable device can check if there is any data scheduled for it by the access node/access point. Some future adaptations of certain wireless systems, such as for example the IEEE 802.11ah version of the wireless local area network (WLAN) radio access technology, have a far larger number of portable devices attached to the same access node (access point AP) than has been the practice in the past. In some cases the network/AP will not be aware in advance of which devices are active. At any given scheduling event by the access node/AP this means that at least some of the scheduled portable devices will be in the sleep mode.

Expanding of the potential number of reporting devices (stations or STAs in WLAN) can also cause problems for the network in identifying which uplink message came from which station, particularly where different WLAN networks adjacent to one another are close enough that uplink messages from a station of one network are received strongly enough by an AP of the adjacent network in overlapping frames. For example, if the AP distinguishes the stations which sent different messages by the message's code sequence, it may be that another station in an adjacent WLAN is also using the same code sequence. Where uplink frames from these two stations overlap the detection performance by the AP will be severely degraded.

Figure 1A:
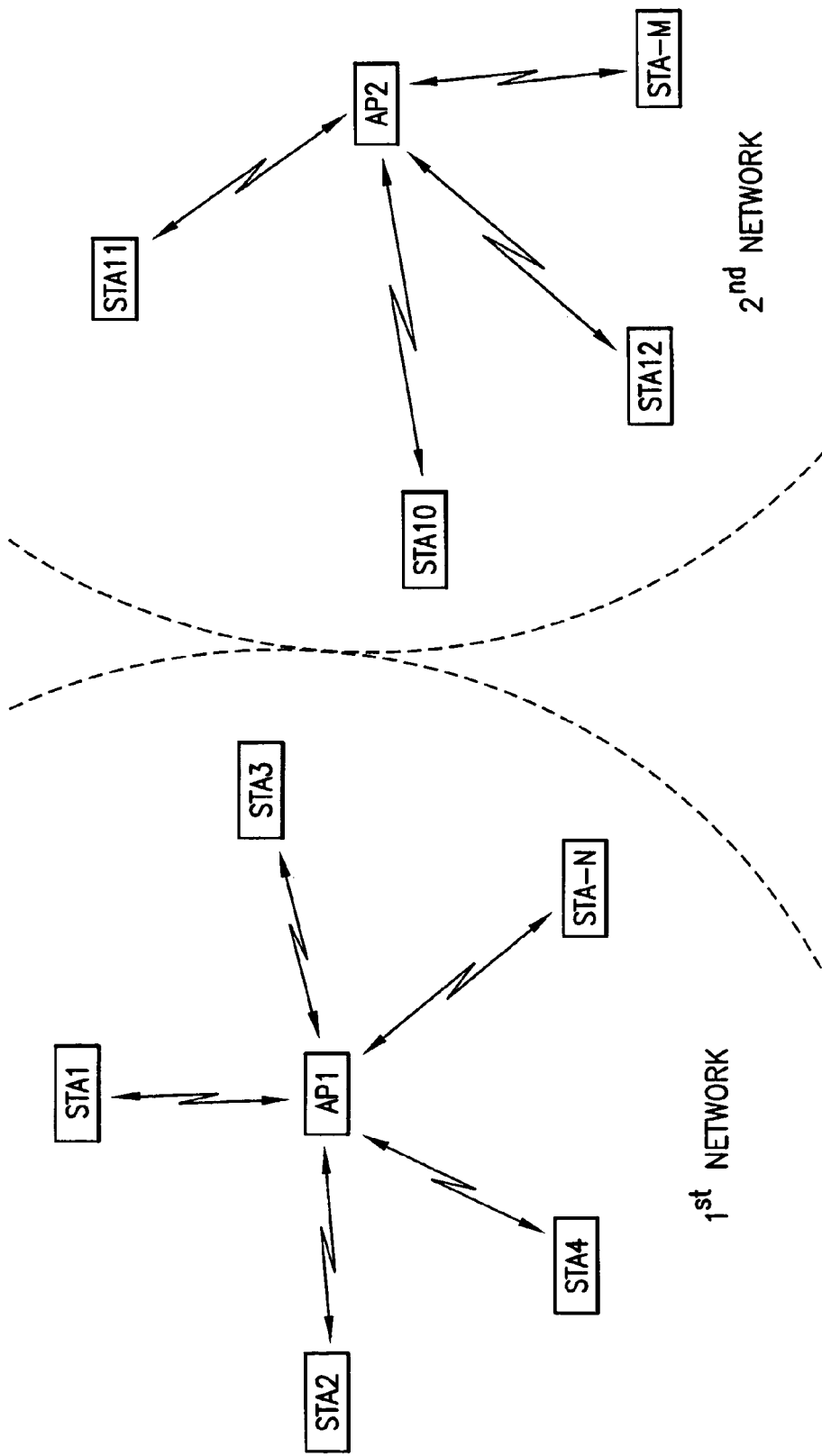
FIG. 1A is a schematic overview illustrating one example of a radio environment with two adjacent WLANs, each with a single AP serving multiple STAs, and in which exemplary embodiments of these teachings enable one AP to positively distinguish an uplink message from a STA of its own network from that of a STA in the adjacent network.

For a fuller appreciation of these teachings FIG. 1A illustrates an example radio environment consistent with two adjacent IEEE 802.11ah networks as mentioned above. In a first network there is a first AP1 serving a plurality of stations shown as STA1 through STA4 and extending through some integer number STA-N. In IEEE 802.11 ah a single AP may serve up to 6000 STA. Adjacent to the first network there is a second IEEE 802.11ah network in which a second AP2 serves a different set of stations shown as STA10 through STA12 and extending through some integer number STA-M. In one deployment contemplated for IEEE 802.11 ah, each STA is associated with an electrical power transmission or distribution point for reporting sensing information to its respective AP to enable a 'smart-grid'. In this case the STAs may be referred to as sensor nodes. By example, each of the APs shown at FIG. 1A may serve meter-based STAs in a large apartment complex and the networks represent adjacent apartment buildings or different portions of the same apartment building. The AP may also perform its own sensing on an electrical transmission/distribution point with which it is associated, which in WLAN terminology makes it an AP-STA. In other relevant radio environments the AP need not also be operating as a STA. Each of the nodes indicated in FIG. 1A as a STA is a non-AP STA.

Power consumption is an important issue for some of the nodes in a network, such as a WLAN network. The nodes may for example rely on limited battery power, and/or they may be far away from each other requiring a high transmission power to send messages. The limited battery power may make it desirable for at least some nodes of the network to utilize limited duty cycles for their wireless or radio interfaces, putting the wireless interfaces to sleep most of the time. Sensor nodes may have duty cycles of less than one percent (<1%), less than five percent (<5%), less than two percent (<2%), or one-tenth of a percent (<0.1%), as non-limiting examples.

Sensor or smart meter applications such as those contemplated for 802.11ah networks have only infrequent reporting of data to the AP. For example smart meter applications typically have a reporting interval of 4 hours. On average, sensor nodes have a clock drift of 30 to 100 ppm resulting in a clock drift of +/−1.4 s during a 4 hour interval. For example, a conventional platform has a drift of up to 40 microseconds per second using a 7.37 MHz clock resulting in a clock drift of 0.6 s during a 4 hour interval.

In order to save energy, the sensor node should be able to wake up and immediately send its data to the AP. But due to the large amount of STA and the large coverage area in 802.11ah, packet collisions will occur frequently and many STA will not be able to send their data. In this case resending of data will be required and this will cause a drain on a battery. Further, a user device needs time to be activated and this additional activation time results in more power utilization. For example, a conventional sensor node needs about 1.66 ms without counting a stateful packet inspection (SPI) acquisition time. From these it follows that for an opportunity to send even one packet, a sensor node may need to be active for about 300 ms, which is also a drain on its battery.

Any given STA may have sensing data to report at regular intervals which the AP can know in advance by coordinating with the STA a regular duty cycle. But also the STAs may perform event-based reporting to inform the AP and system management of some anomaly the particular STA sensed, or once some non-chronological threshold is reached that triggers a new report. For these reports the AP will not know in advance to expect a report from that STA.

Figure 1B:
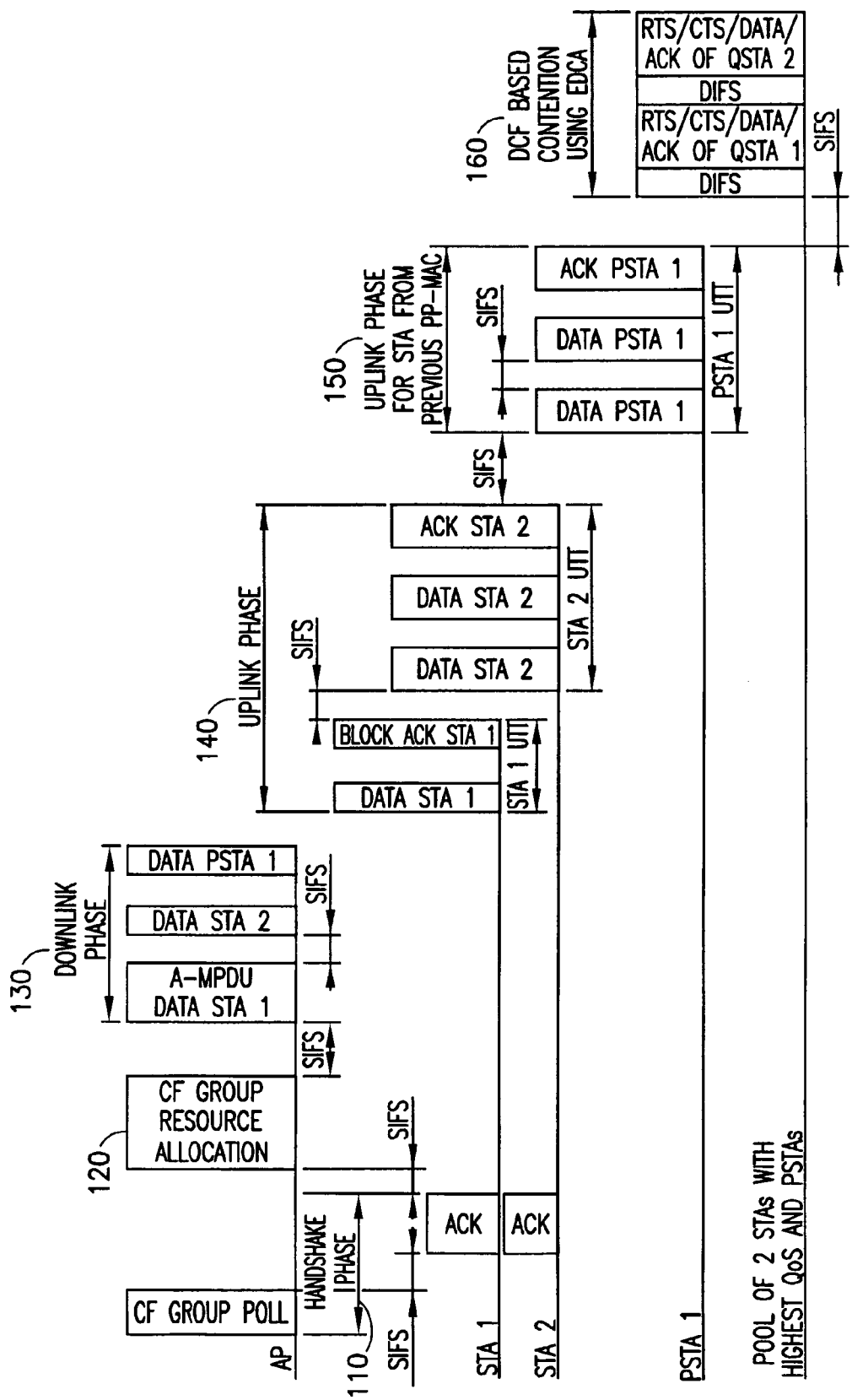
FIG. 1B illustrates an uplink and downlink Mechanism for a poll (or probe)/pull medium access control PP-MAC mechanism in which STA detection may be difficult for the AP for the uplink ACKs, and where exemplary embodiments of these teachings resolve that difficulty.

FIG. 1B is a timing diagram illustrating what may be termed a poll and pull (or probe and pull) medium access control (PP-MAC) scheme to intersperse and group-schedule downlink and uplink transmissions for a network device, such as a STA in a WLAN, as well as prioritize contention periods for user devices based on a quality of service required.

For example, the sensor nodes and/or devices may keep their wireless interfaces in a sleeping, inactive, or low-power state until they have data to send. While the sleeping, inactive, or low-power state may refer to the state of the wireless or radio interfaces, the sleeping, inactive, or low-power state may also refer to a state of other circuitry or modules within the nodes, such as baseband processors which may process, modulate, and/or demodulate data for transmitting and/or receiving by a wireless or radio interface. The devices, which may include sensor nodes, may, for example, monitor events while maintaining their wireless or radio interfaces in the inactive state. When a sensor node has data to send, the sensor node may transition its wireless interface (or other module) to an active state. In the active state, the sensor nodes/APs may listen for PROBE messages from the AP, which may initiate the sending of the recorded data from the sensor nodes to the AP.

The AP may also have a limited duty cycle, or may continually maintain its wireless interface in an active state. The AP may send PROBE messages to the sensor nodes periodically, and/or non-periodically and/or based on prompts from outside a network, such as outside a wireless network. The PROBE message may identify a group of sensor nodes, or may be broadcast. The sending of the PROBE message that identifies the group of sensor nodes may allow the access point to probe the sensor nodes in the group in parallel to determine which sensor nodes have data to transmit, how much data each sensor node needs to transmit, and the quality of service required for each sensor node's data transfer.

The PP-MAC sequence shown by example at FIG. 1B can be used to enable a device, such as an access point, to receive an ACK from each of the multiple devices of a wireless network and to detect which device each ACK came from. To distinguish from the multiple ACKs which user device(s) want to transmit data at any given time, the AP must distinguish each of the poll responses of the multiple users. In some common deployments, it is possible to have hundreds or thousands of nodes (e.g., sensor applications) wanting to transmit concurrently. Considering the amount of poll responses of such a deployment the difficulty for the AP to distinguish each of the poll responses can be exceedingly difficult. An AP using a conventional MAC implementation would be required to use very long sequences of data and high computational complexity at least in order to distinguish poll responses.

The comprehensive PP-MAC mechanism can be implanted for downlink and uplink transmissions for the STAs or user devices in a WLAN. Therefore the STAs will wake up only at the scheduled durations for their downlink and uplink transmissions and sleep during durations for transmissions of other STAs in the WLAN. In accordance with the exemplary embodiments the PP-MAC mechanism is energy-aware.

The PP-MAC mechanism shown at FIG. 1B is interspersed with scheduled durations for downlink and uplink transmissions as well as contention periods for STAs or user devices based on quality of server (QoS) requirements. The addition of a contentious access for QoS sensitive traffic is an effective mechanism and seen to be an improvement over at least the IEEE 802.11 power save multi-poll (PSMP) framework. Additionally, the PP-MAC mechanism can provide for an enhanced transmission of traffic specification (TSPEC) information by each of the STAs as specified in the PSMP framework.

The PP-MAC layer implementation may enable at least one of:
  PP-MAC allocation for probed STAs, STAs from a previous PP-MAC duration (termed as PSTAs), and QoS-constrained STAs;
  Provision of predefined allocation for uplink transmission durations from PSTAs, which were not able to complete transmission of its queued packets;
  Provision for predefined allocation of downlink transmission for PSTAs;
  Restrictive distributed control functions (DCF) among STAs such as based on selected QoS constraints to:
    restrict a contention to STAs with higher QoS constraints; and
    provide a fairness or balanced resource allocation mechanism which allows access to STAs which were not granted access within the uplink phase, such as during a contention phase; and
  Use of Reduced Interframe Space (RIFS) in the handshake phase as well as in downlink and uplink phases between transmissions to and from STAs.

In the FIG. 1B example the user devices are categorized into different groups with each group having its own group identifier (ID) and each user device of the group having their own ID. Hence, each user can be identified by a group and/or a user ID. The grouping or user ID allocation can be performed arbitrarily or can be based on different factors such as the device category or a device type, quality of service requirement of each user device, and/or path loss between a user device and an AP when an association takes place. In an exemplary embodiment, all user devices within a group may be located on a particular ring and/or cell boundary and/or belong to the same device, same QoS category, and/or cluster. Grouping user devices placed within as same or similar distance from AP provides a simple way to overcome, for example, near-far problems in a multiple access scenario. Further, the grouping can be based upon information that a user device provides to an AP when the device was initially associated with a network for example. In addition, such information regarding a user device can include a device category and/or a device type, a QoS requirement for the device, and/or other information associated with the device.

The AP can utilize a PP-MAC probe type packet in order to probe multiple user devices at a time. Then, based on responses to the PROBE messages, the AP can schedule only those user devices that have data to transmit. To implement this, the AP is able to resolve ACK responses to the PROBE messages from multiple user devices in order to identify the user device from which a particular ACK was received.

In accordance with an exemplary embodiment of the invention, user devices in a WLAN are partitioned into groups based on various factors using information regarding each of the user devices. Then the user devices as partitioned are assigned to specific sequences (for example, spreading sequences or Zadoff Chu sequences) which are used to resolve the user devices within a user group. The grouping or partitioning can be performed based on a user ID or can be performed, for example, arbitrarily or based on different factors such as the device category and/or device type, quality of service requirement of each user, and/or path loss between user and AP when the association takes place.

The user devices may be grouped according to a location on a ring and/or cell boundary and/or based on their association with a similar device. Further, user devices can be grouped according to a service level agreement with an operator, and/or based on their QoS requirements, and/or based on the device location, such as the location being near or far away with regards to another device. Grouping user devices located a same (or similar) distance from an AP can be an easier way to overcome problems, for example near-far problems associated with a multiple access scenario. The grouping can be performed using information that a user device has provided to an AP, such information can include as a device category, and/or a device type and/or device QoS, information. Such information can be obtained from the user device when the user device was early and/or initially associated with the network for example. Further, in accordance with the exemplary embodiments, the information can be obtained over a link to a cloud service to get the parameters on how the sensor node should operate. Meanwhile, the AP measures the channel using preambles and pilots presented in the association packet and estimates path loss between the AP and a STA which also can be used for grouping users. The group ID and/or user ID (or sequence information) can also be distributed to the devices, in parallel, using a PROBE message, as in FIG. 1B.

There are many different design choices for how the AP assigns sequences to the different groups and user devices. While the sequences described with respect to the invention may be described by example as Zadoff-Chu sequences, the exemplary embodiments of the invention can be used with other orthogonal codes and/or sequences as well. For the case where Zadoff-Chu sequences are used, each group could be identified by a different root sequence and users within the group uses different cyclic shifts of the root sequence. In this manner, different groups with different device categories and/or device types, QoS, and/or cluster can be distinguished based on the root sequence.

Now described with reference to FIG. 1B is the illustrated Uplink and Downlink Mechanisms for the PP-MAC. In non-limiting embodiments of the invention, the PP-MAC enables novel uplink and downlink mechanisms which enable operational phases comprising a handshake phase 110, a PP-MAC allocation 120, a downlink phase 130, an uplink phase 140, an uplink phase for STAs from a previous PP-MAC 150 and a contention phase 160. Each of these operations is described below in more detail. While FIG. 1B uses specific terms for the contention free (CF) group poll and the CF group resource allocation 120, these messages may be known in other embodiments by other terms such as for example a probe and a PP-MAC allocation frame, respectively, as but one example of substitute names.

Handshake Phase 110:

In this phase, in accordance with the exemplary embodiments of the invention, the probe/poll can probe/poll one or multiple groups as indicated at FIG. 2 by the "Number of Groups" field, where each group may have a predefined number of STAs. An idea of this probe signal is to inquire whether STAs in a group have packets to transmit. This probe is performed over all the groups sequentially over the proposed 6000 STAs. Based on the probe signal received, the STAs in this group respond with an ACK. The preamble in the ACK may provide an idea to the AP about the class of traffic including a coarse estimate of amount of data traffic allocation required (high, medium, or low) by the STAs in the probed group.

CF Group Resource Allocation 120:

Based at least partly on the ACK signal received from the probed group, the AP prepares an allocation schedule for the group. This allocation may include both downlink schedules for the STA of currently probed group as well as for STAs from previous PP-MAC duration, also termed as previous STAs (PSTAs), as in FIG. 1B. In an embodiment there may be provided a deterministic periodic PP-MAC duration, with configurable periodicity, which initiates with the probe signal and terminates with the contention period. The durations for uplink transmissions from STAs are estimated by the AP based on the traffic class deduced from the preamble of the pull signal. In addition, the duration can be a fixed allocation or fixed duration if there is no additional information of the traffic allocation requirements at the individual stations, and/or the duration can be determined based on the application and the past traffic of the STA, for example. In another exemplary embodiment, the AP can conservatively start with smaller allocated duration for uplink transmission by each STA. In the next PP-MAC duration, the AP can increase the duration for each STA. It should be noted that the duration for PSTAs can be determined from the last PP-MAC duration. Such as in a last duration where the STA had indicated in a last transmitted packet the remaining buffer size and/or indicated duration required to transmit data in a buffer. It is noted that the downlink and uplink phases can be flexible, such as, based on probed STAs and PSTAs. Further, in accordance with the exemplary embodiments, one or more of the phases, as illustrated in FIG. 1B, can be adjusted by the AP to achieve maximum spectrum utilization.

Normally, a STA would enter an idle/sleep stage following a probe if the STA has no data to transmit/receive. However, if a STA has data to transmit/receive or if the STA has data remaining which could not be transmitted during a prior resource allocation then a PSTA will be scheduled and the STA is required to stay in active mode for a following probe, pull or a next probing interval to receive the needed resource allocation. In addition, it is possible that the AP missed the ACK of a STA, such as in a downlink, and/or that the AP is not able to serve the STA, such as in an uplink direction, due to overload situations or that the STA cannot decode its allocation. In any of these cases the AP might not schedule the STA as P-STA. However, it is possible that a STA has missed an ACK and/or that the AP is not able to serve the STA due to overload situations and/or that the STA cannot decode its allocation. In each of these cases the AP might not schedule the STA as P-STA.

In order to limit the number of CF group resource allocation messages 120 that a STA is required to monitor, hence wake-up for, the exemplary embodiments of the invention provide a use of a timer. After a station has transmitted its data during an allocated uplink phase 140 and/or indicated to the AP that it has more data to transmit, the station starts a timer. At an expiry of the timer the STA will drop any leftover packets. Further, in accordance with the embodiments, if the STA is scheduled uplink resources before the expiry of the timer, for example during a next PP-MAC duration, the station transmits the data and cancels the timer. However, if the station is not allocated resources in a future or next CF group resource allocation message 120 and/or if the station could not decode the CF group resource allocation, the station will continue checking for the CF group resource allocation messages at least until the station is again probed.

In general for the PP-MAC of FIG. 1B the AP selects group 1 to poll. Based on the CF group poll if it is determined that the STA of group 1 does not have data to send then the STA enters or returns to a sleep mode. If, based on the group poll it is determined that the STA has data to send then the STA sends an acknowledgement (ACK) of the group poll. Following the ACK, a CF group resource allocation 120 is received by the STA and a timer may be started. While the timer is operating, the STA transmits and/or receives its data using the CF group resource allocation, as shown for STA1 and STA2 in the downlink 130 and uplink 140 phases. If the STA still or again has data to send and/or receive, and/or if the timer has a value of time remaining, then the STA stays awake. For this case, the STA waits for another CF group resource allocation to send/receive the remaining data. If the STA does not have more data to send then the STA returns to a sleep mode, at least to conserve power.

Downlink Phase 130:

This phase is initiated after the broadcast of the PP-MAC allocation and/or a predetermined short interframe space (SIFS) period. Aggregated frames for designated STAs are sent by the AP during the durations specified in the PP-MAC allocation. An ACK, or a block-ACK, will be sent by the receiving STAs to the AP during the uplink phase 140 as shown in FIG. 1B. The ACK or block-ACK may also be sent immediately after a downlink transmission. Note also that CF group resource allocation can allocate time slots for STAs, such as identified in a previous CF group resource allocation, in order to receive packets from the AP.

Uplink Phase 140:

In this phase, the probed STAs transmit their queued packets to the AP along with an ACK for previously received packets, such as packets received from an AP in the previous downlink phase. Each STA can transmit its packets within its allocated transmission duration. In case of packets still queued at the STA, the last packet contains information (e.g., 4 bits) about the additional data information still left to be transmitted. This information is utilized by the AP to schedule additional time duration required for the STAs in the next PP-MAC duration. This computed durations are then broadcasted in the CF group resource allocation.

Uplink Phase for STAs from Previous CF Group Resource Allocation (Previous PP-MAC) 150:

This phase relates to a transmission of data packets of those STAs that did not complete transmitting all their queued packets within the designated uplink duration. The intermittent packets from one STA are transmitted after reduced interframe space (RIFS) durations, for example. The ACK for the downlink transmissions from the AP to one or more PSTAs has to be completed within the specified uplink durations. As the non-limiting embodiment of FIG. 1B illustrates, only one PSTA is allocated time slots for both downlink and uplink transmissions.

Contention Phase 160:

For STAs and PSTA that could not get sufficient allocation in the contention free period or were not part of the probed group and have data to transmit to the AP, also termed as QoS-enhanced stations (Q-STAs), in an embodiment there is included a contention period whose duration is specified in the CF group resource allocation. For the contention phase, enhanced distributed contentious access (EDCA) could be used with varying values of contention windows for various QoS classes of traffic and is proposed to be executed within this duration. If the designated STAs are not allocated in the uplink phase, it can sleep for the downlink and uplink phases and wake up only at the initiation of the contention period defined in the CF group resource allocation. It is also possible that the contention phase is prioritized to stations that could not be allocated sufficiently during the uplink allocation since the exact amount of transmission resources needed may be unknown to the AP from the ACK signal.

It is noted that an actual order of allocation of the phases could be different from what is mentioned above e.g. the uplink phase could be before the downlink phase. Also, if a station has data to transmit, it can indicate its data requirements in the ACK message in response to its downlink data (either a 1 bit indicator indicating it has uplink traffic or more bits to indicate the amount of data allocation required). This might be especially beneficial for STAs that could otherwise not complete transmission within its allocated duration in the uplink phase.

The ACKs from the AP for all the uplink transmissions can be performed after the end of two uplink transmissions or can be performed after each uplink transmission from an STA.

Reviewing again the PP-MAC scheme of FIG. 1B, it is clear that the AP needs to distinguish all of the various messages it receives from the STAs. The uplink data frames may identify a particular station from the uplink resource (time and frequency) on which it is sent, since the AP allocates that in its group resource allocation 120. Or the data frames may identify the sending STA by means of a temporary ID, a device ID, or a sequence as noted above. It is different with the ACK messages. These are very short messages, so to preserve efficiency in how the scarce radio spectrum is used they should not be burdened with too much control signaling overhead to identify the STA using an explicit identifier.

According to an embodiment the ACKs also identify the STA which sent it by means of a code sequence, such as for example a Zadoff-Chu sequence. But as noted above, in some deployments the AP may not know in advance exactly which STAs might be sending uplink data so each of the many STAs in an 802.11ah WLAN, or at least those in a same polling group, would be assigned a unique code sequence. The number of Zadoff-Chu sequences for identifying different stations can be expanded beyond only the different root sequences by using different cyclic shifts, so for example all STAs in a group being polled may utilize the same Zadoff-Chu sequence each with a different cyclic shift. For brevity the term code sequence as used herein refers to any of these cyclically shifted root sequences, including the root sequence itself which has a zero shift. The root sequence with zero shift is distinguished from other sequences by referring to it as only the root sequence or as the code sequence root.

Still this does not resolve all the issues that may arise because the WLAN cannot be assumed to always occupy the unlicensed band radio spectrum alone. Considering the FIG. 1A scenario, it may be that an ACK from STA10 intended for AP2 are received strongly enough at AP1 that AP1 attempts to decode it. If the frame in which STA1 and STA10 overlap and both those STAs are using the same code sequence to send their ACK, the AP1 cannot use the code sequence to distinguish the different ACK from STA1 from that of STA10.

For adjacent or otherwise nearby networks such as the two shown at FIG. 1A, if those multiple APs use the same Zadoff-Chu sequence root values and ACK frames from their respective basic service sets (BSSs) are overlapped, the detection performance of parallel or sequential ACKs at a given AP would be severely degraded as mentioned above. This has the potential to adversely impact the spectrum efficiency that otherwise might be gained by allocating radio resources using the CF group resource allocation 120. The inventors have determined that dynamically signaling the sequence root value in the BSS without conflict in the sequence root usage is a way to resolve this detection performance/identification problem in the overlapping BSS (OBSS) scenario.

As a review of the above FIG. 1B description, some of the salient features of PP-MAC include:
  predefined allocations for uplink and downlink transmissions for STAs in a probed group;
  predefined allocations for uplink and downlink transmission from STAs that were not able to complete transmission of its queued packets in previous probed/polled groups (the P-STAs above); and
  restrictive distributed coordination function (DCF) allocation among STAs with selected QoS constraints (the Q-STAs above).

FIG. 2 illustrates an exemplary embodiment of certain information elements within the CF Group Poll shown in FIG. 1B. It includes information elements for: frame control; destination address; transmitter address, BSS ID; total number of groups; group ID of the group being polled; AP transmit power; ACK target power; next probe for the identified group; ID of next groups to be polled, and a cyclic redundancy check (CRC) for forward error control of the frame. In an exemplary embodiment of these teachings, there is added to the CF Group Poll an information element to indicate the sequence root value that is in use for the group being polled. FIG. 4 shows a non-limiting embodiment of such a new information element to be added to those shown at FIG. 2 which lie within the CF Group Poll.

FIG. 3 illustrates an exemplary time slot structure for parallel ACKs (top) and sequential ACKs (bottom). The ACKs of FIG. 1B which the STAs send in a same time slot (for example, sequences 5 through 8 at the top of FIG. 3) in response to receiving the CF group poll are parallel, and ACKs which the STAs send in different time slots in response to receiving downlink data are sequential ACKs. After receiving a CF Group Poll message from the AP, a given STA with uplink data to send transmits its ACK to the AP after a SIFS as shown in FIG. 1B. Assume for example that the sequences used to distinguish the ACK of one STA from the ACK of another STA are Zadoff-Chu sequences. FIG. 3 demonstrates that it is both the STA's Zadoff-Chu sequence number and the time slot number which are used to uniquely identify a particular STA in a WLAN.

To distinguish among STAs in different (adjacent) networks, the different BSSs will use different sequence roots according to an embodiment of these teachings. Below are detailed exemplary but non-limiting embodiments of how to signal the sequence root in the CF Group Poll message to resolve/avoid conflicts in the sequence usage in OBSS scenario such as that shown at FIG. 1A.

In accordance with an exemplary embodiment of these teachings:

The sequence root parameter is signaled in CF-Group poll frame.
Sequence root conflicts such as in the OBSS scenario are then resolved by
  Conflict detection at the AP
  Conflict detection at the STA (which may be either STA initiated or AP initiated)

In accordance with the examples detailed below, there is included in the CF Group Poll message or frame the sequence root value or values which is/are used in the BSS. This additional information allows those STAs which are probed in the CF Group Poll frame to learn about the sequence root value used for parallel/sequential ACK transmission. As one non-limiting example, FIG. 4 illustrates a new information element 400 to be added by these teachings to the CF group poll which indicates the root value 402 of the Zadoff-Chu sequence (or other code sequence) used for ACK transmissions in this BSS.

In the OBSS scenario, different BSSs must choose different sequence roots exclusively to mitigate mutual interference caused by overlapped ACK frames. Including the sequence root value 402 in the CF Group Poll enables the APs and the STAs, in both the network in which the group poll is sent and in adjacent networks, to detect sequence root usage in surrounding BSSs so that if a conflict is detected, the AP knows to change its sequence root to a different value.

As noted in summary above, if there is a conflict among nearby networks in the sequence root that conflict may be detected by the AP or by a STA. For example, the first AP can detect such a conflict by scanning surrounding BSSs and detecting sequence root values contained in CF Group Polls that are broadcast or multicast by those different nearby APs. If the first AP detects from that scanning that there is a conflict in the usage of sequence root values from surrounding BSSs, the first AP which did the scanning can change its sequence root value immediately to a different value. The change of the sequence root can then be signaled in the first AP's next CF Group Poll frame. The first AP maintains list of root sequences used by other BSSs based on the AP detection and/or STA reports. The list is periodically updated and the period of these updates could be configurable by the AP. For example, the list may be updated when a STA report or AP detection indicates a change in the root sequence used by another AP, or after a predefined interval of time. When the AP detects a conflict, the AP updates the list and changes it root sequence. The root sequence can be chosen randomly from the possible sequences which are not in use by other BSSs and not in the list.

The STA can also detect that there is a conflict in the sequence root among nearby networks, and here there is detailed two approaches: STA initiated and AP initiated. For the STA initiated approach, if any STA detects the same root sequence usage from surrounding BSSs (which the STA can detect similar to the AP detection above, by detecting the sequence root value in the CF Group Poll), then the detecting STA then sends a control message to its serving AP. This control message includes for example a list of sequence root usages from surrounding BSSs, as is shown by example at FIG. 5A as a non-limiting embodiment of a format for a new sequence usage report frame.

Figures 5A, 5B:
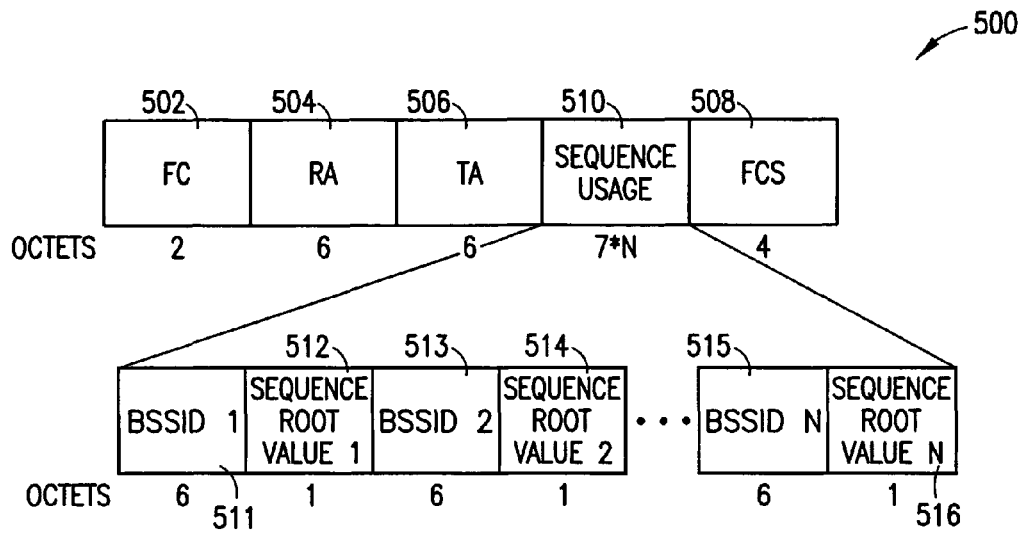
FIG. 5A illustrates a non-limiting example of a format for a new sequence usage report frame by which a STA can inform its AP of what sequence roots are being used by nearby WLANs according to an exemplary embodiment of these teachings.
FIG. 5B illustrates a non-limiting example of information elements within the sequence usage report frame of FIG. 5A according to an exemplary embodiment of these teachings.

Some of the information elements in the sequence usage report frame 500 of FIG. 5A were detailed at FIG. 2 and are again shown at FIG. 5B which information elements within the sequence usage report frame of FIG. 5A. Namely, the frame control FC 502, receiver (or destination) address RA 504, transmitter address TA 504 and the frame checksum (FCS, a specific type of CRC) 508 are also detailed further at FIG. 2. To inform its AP of what sequence roots are being used by nearby WLANs, the STA includes in the sequence usage report frame also a sequence usage information element 510. For each BSS the STA detects, there is a field for the BSS ID 511, 513, 515 and for the sequence root value 512, 514, 516 that corresponding BSS is using.

Once the AP receives sequence usage report 500 from a STA, the AP can immediately change its sequence root value to a different value not listed in sequence usage 500. The change of sequence root may then be signaled to the AP's STAs in the BSS in the next CF Group Poll frame.

Figure 6:
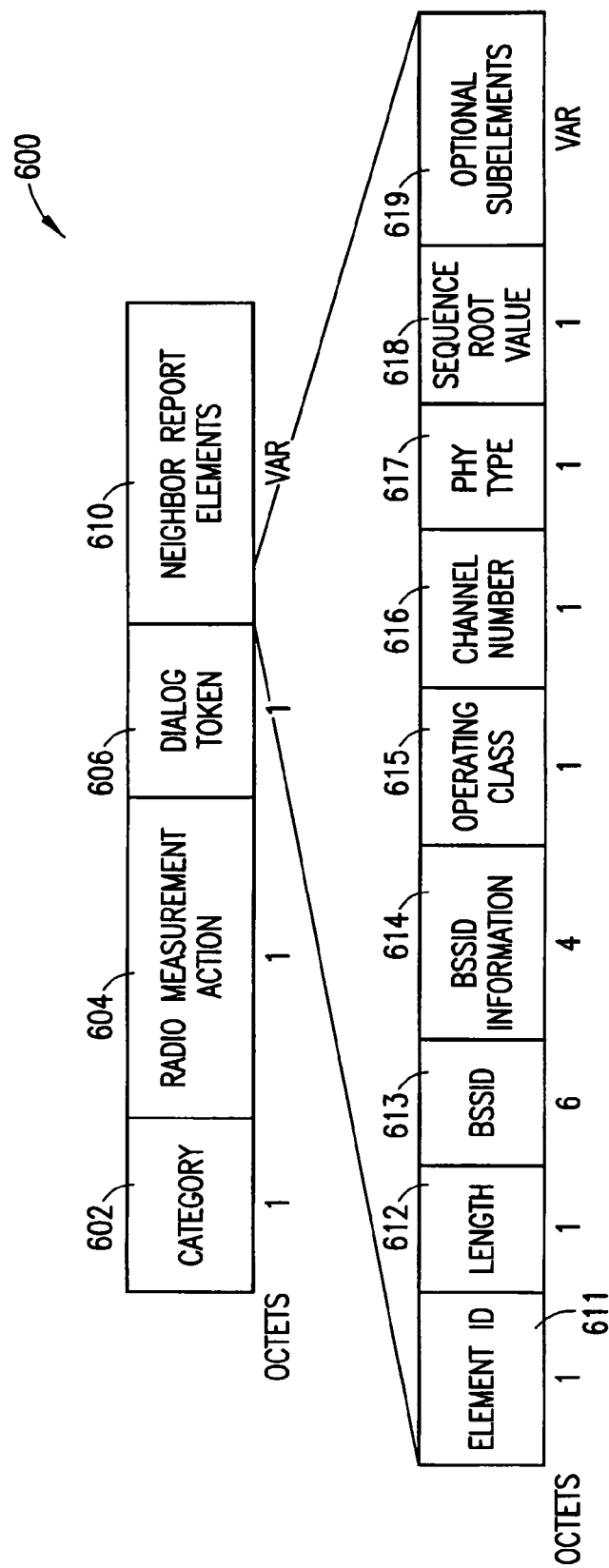
FIG. 6 illustrates a non-limiting example of a format for a new neighbor report response frame which a STA sends in response to a corresponding request by its AP to scan for neighbor sequence roots in use according to an exemplary embodiment of these teachings.

One exemplary embodiment for how the AP can initiate the STA to detect if there is a conflict in the sequence root among nearby networks is shown with reference to FIG. 6, which illustrates a non-limiting embodiment of the format for a new neighbor report response frame. The STA sends such a neighbor report response in reply to a corresponding request by its AP that the reporting STA scan the CF Group Polls transmitted/broadcast by neighbor APs for neighbor sequence roots in use.

In one non-limiting example, the AP initiates this check by broadcasting a neighbor report request frame, which itself is known in the IEEE family of standards (see for example FIG. 8-216 of 802.11REVmb D6.0, September 2010). The neighbor report request frame uses the body format of the Action frame (see Chapter 8.5.7.6 in the above-referenced document), and is transmitted by the AP to request information in the neighbor report about neighboring APs. But unlike conventional 802.11 polls, in an embodiment of these teachings now those neighbor CF group polls will include an indication of what Zadoff-Chu (or other) sequence is in use in their WLAN (or at least on use for that polled group if the AP is allowed to use different sequence roots for different groups under that same AP). As the response to the neighbor report request frame, the replying STA transmits the neighbor report response frame, which in one non-limiting embodiment uses the Action frame body format (see FIG. 8-217 and FIG. 8-162 in 802.11REVmb D6.0, September 2010). FIG. 6 illustrates a non-limiting embodiment of the format for such a neighbor report response frame 600.

The exemplary neighbor report response frame 600 has a Category field 602 which by example is set to 5 (for backward compatible consistency). There is also a Radio Measurement Action field 604 which by example has value 5 (also for backward compatible consistency). There is a Dialog Token 606 which by example is set to the value in the corresponding neighbor report request frame. Each report element in the Neighbor Report Elements field 610 describes an AP and has information elements as shown in FIG. 6 and further described immediately below.

The Element ID field 611 in the neighbor report 600 is for example set to 52 (also for backward consistency) and the Length field 612 indicates (in octets for example) the length of information elements in the report element. Further in the neighbor report elements field 610 there is also, for each detected neighbor APs which the STA includes in its report 600, a BSS ID 613, further information about the BSS ID 614, an operating class 615, channel number 615 and physical layer type 617.

According to an exemplary embodiment of these teachings, within the neighbor report elements field 610 there is also appended the sequence root value information element 618 as illustrated at FIG. 6, for each of the APs included in the neighbor report elements field 610. The sequence root value 618 signals the measured sequence root value at the BSS which is denoted by the corresponding BSS ID field 613. Depending on whether the reporting STA detects one or more neighbor APs, the neighbor report elements field 610 may contain information about only one or multiple surrounding BSSs which the STA has detected.

The AP may task only one STA or preferably more than one STA to send such a neighbor report response 600. Based on the neighbor report response frames that the subject AP receives from the STAs, the AP can then detect conflicts from different BSSs by looking at their respective sequence root value 618 in those reports 600. If conflicts are detected, the AP can then change its sequence root value, for example to one that is not listed in any of the neighbor report elements field 610. The AP can then signal to its own STAs that change of sequence root in the BSS within the next CF Group Poll frame.

Figure 7A:
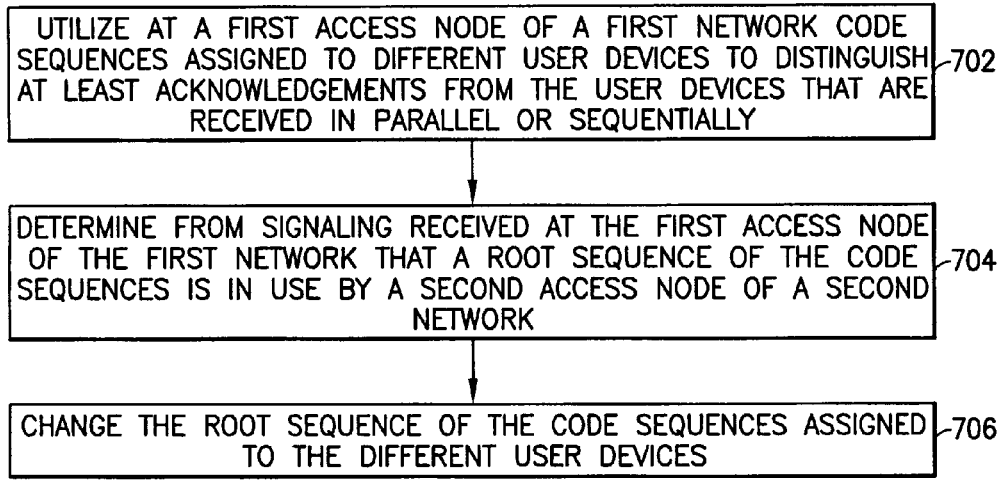
FIG. 7A is a logic flow diagram that illustrates from the perspective of an access point AP the operation of a method, and a result of execution by an apparatus of a set of computer program instructions embodied on a computer readable memory, in accordance with the exemplary embodiments of this invention.
Figure 7B:
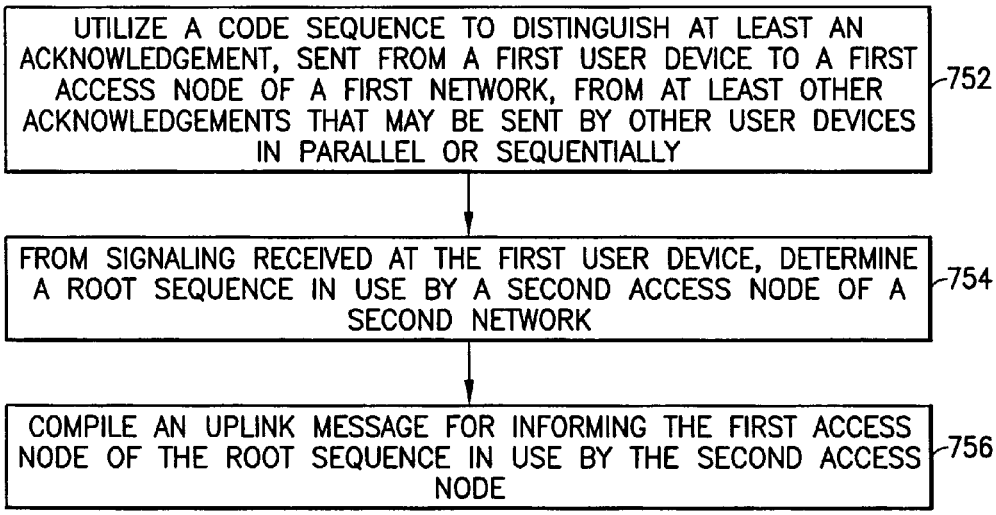
FIG. 7B is a logic flow diagram that illustrates from the perspective of a station STA the operation of a method, and a result of execution by an apparatus of a set of computer program instructions embodied on a computer readable memory, in accordance with the exemplary embodiments of this invention.

The logic flow diagrams of FIGS. 7A-B summarize some of the non-limiting and exemplary embodiments of the invention from the perspective of the AP 22 or certain components thereof if not performed by the entire AP (FIG. 7A), and from the perspective of the STA 20 or certain components thereof if not performed by the entire STA (FIG. 7B). These Figures may each be considered to illustrate the operation of a method, and a result of execution of a computer program stored in a computer readable memory, and a specific manner in which components of an electronic device are configured to cause that electronic device to operate, whether such an electronic device is the access node in full or one or more components thereof such as a modem, chipset, or the like.

The various blocks shown at FIGS. 7A-B may also be considered as a plurality of coupled logic circuit elements constructed to carry out the associated function(s), or specific result of strings of computer program code or instructions stored in a memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

First consider FIG. 7A which is from the perspective of the AP. At block 702 the AP utilizes, at a first access node of a first network, code sequences assigned to different user devices to distinguish at least acknowledgements from the user devices that are received in parallel or sequentially. At block 704 the AP determines, from signaling received at the first access node of the first network, that a root sequence of the code sequences is in use by a second access node of a second network. In the above examples there were multiple approaches for how the AP can do this; listen to the neighbor AP polls itself, or the AP can receive from the STA a STA-initiated neighbor report, or the AP can initiate the STA to send a neighbor report. Thereafter at block 706 the AP changes the root sequence of the code sequences assigned to the different user devices.

Also noted above for the AP but not specifically shown at FIG. 7A is the AP's list of the root sequences in use by its neighbor APs and which are in the neighbor BSSs. The AP stores this list in its local memory. In one embodiment this list is first created by the STA neighbor reports which the AP receives and/or by the AP checking the neighbor BSSs directly. Then periodically the AP updates this list, either by detecting itself the BSSs of its neighbor APs or from the neighbor reports it receives from its STAs or both. The periodicity of these updates may be anytime the AP determines from its own detection or from the reports it receives from its STAs that there is a change in at least one of the neighbor's root sequences/BSS. Or in another embodiment the periodicity may be strictly chronological, some predefined time interval. These may be combined so that there may be an update regardless of the predefined time interval anytime there is a change to a neighbor root sequence.

Once the AP detects that a neighbor root sequence is the same as the root sequence it is using itself (or the same as one of them if the AP is utilizing multiple root sequences) the AP may then decide there is a conflict and change its conflicting root sequence to a new one. In one embodiment the AP chooses the new root sequence randomly, but excluding all root sequences on the list it has stored in its local memory. Any of these embodiments concerning the list may be utilized in addition to the embodiment of FIG. 7A, and more particularly with any of the above options concerning AP detecting or AP/STA-initiated STA detecting of the neighbor root sequences that are currently in use.

Now consider FIG. 7B which is from the perspective of one of the STAs. At block 752 of FIG. 7B the STA 20 utilizes a code sequence to distinguish at least an acknowledgement, sent from a first user device to a first access node of a first network, from at least other acknowledgements that may be sent by other user devices in parallel or sequentially. Then at block 754, from signaling received at the first user device, the STA determines a root sequence in use by a second access node of a second network. In the examples above this can be initiated by the AP or by the STA. And afterwards at block 756 the STA compiles an uplink message for informing the first access node of the root sequence in use by the second access node.

Reference is now made to FIG. 8 for illustrating a simplified block diagram of various electronic devices and apparatus that are suitable for use in practicing the exemplary embodiments of this invention. In FIG. 8 a first AP1 22 is adapted for communication over a wireless medium/link 10 with an apparatus, such as a mobile device/terminal or a radio-equipped sensor or a user equipment, all of which stand in the place of the AP sending the CF group poll to the STA in the examples above. FIG. 8 shows only one STA 20 but as noted above there may many STAs served by a single AP 22. The AP 22 may be any access node (including frequency selective repeaters) of any wireless network such as WLAN in the examples above, or it may be an access node (Node B, e-Node B, base station, etc) that utilizes some other radio access technology such as for example cellular technologies LTE, LTE-A, GSM, GERAN, WCDMA, and the like which may utilize parallel or sequential ACKs or other uplink messages. The various STAs may also form a cognitive radio network, with one of the cognitive radios or a node of a formal network taking on the functions detailed above for the AP. Via data link 14 the AP 22 provides the STA 20 with connectivity to further networks, for example, a data communications network/Internet as shown and/or a publicly switched telephone network.

The STA 20 includes processing means such as at least one data processor (DP) 20A, and storing means such as at least one computer-readable memory (MEM) 20B storing at least one computer program (PROG) 20C or other set of executable instructions. The STA 20 may also include communicating means such as a transmitter TX 20D and a receiver RX 20E that may be embodied for example in a chipset or RF front end chip. In some embodiments the STA 20 may comprise one or more antennas 20F, and the TX 20D, RX 20E and antennas 20F are for bidirectional wireless communications with the AP 22 and also for receiving broadcast polls from neighbor APs shown in FIG. 8 by example as the second AP2. Also stored in the MEM 20B of the STA 20 at reference number 20G is the device's algorithm or function or selection logic for compiling a neighbor report to include an indication of the root sequence in use by the neighbor APs that the STA can receive and detect, as detailed above in various non-limiting examples.

The first AP1 22 may comprise processing means such as at least one data processor (DP) 22A, storing means such as at least one computer-readable memory (MEM) 22B storing at least one computer program (PROG) 22C or other set of executable instructions. The AP22 may also comprise communicating means such as a transmitter TX 22D and a receiver RX 22E for bidirectional wireless communications with the STA 20, for example via one or more antennas 22F. The AP 22 may store at block 22G the algorithm or function or selection logic for including in the group polls that it sends an indication of its own root sequence used for at least those STAs in the group being polled, if not all STAs that are attached to this first AP1, as set for by non-limiting examples above.

The second AP2 has similar DP, MEM storing one or more PROGs, TX, RX and antennas as does the first AP1. And also similarly the second AP2 also has a PROG or logic for including in its group poll an indication of the root sequence it assigned to those STAs attached to the second AP2 and in the group being polled.

At least one of the PROGs 22C/22G in the first AP1 22, and PROGs 20C/20G in the STA 20, is assumed to include a set of program instructions that, when executed by the associated DP 22A/20A, may enable the device to operate in accordance with the exemplary embodiments of this invention, as detailed above. In these regards the exemplary embodiments of this invention may be implemented at least in part by computer software stored on the MEM 20B, 22B which is executable by the DP 20A of the STA 20 and/or by the DP 22A of the first AP1 22, or by hardware, or by a combination of tangibly stored software and hardware (and tangibly stored firmware). Electronic devices implementing these aspects of the invention need not be the entire devices as depicted at FIG. 8 but may be one or more components of same such as the above described tangibly stored software, hardware, firmware and DP, or a system on a chip SOC or an application specific integrated circuit ASIC.

In general, the various embodiments of the STA 20 can include, but are not limited to digital devices having wireless communication capabilities such as radio devices with sensors operating in a machine-to-machine type environment; or personal portable radio devices such as but not limited to cellular telephones, navigation devices, laptop/palmtop/tablet computers, digital cameras and music devices, and Internet appliances. In this regard even in the machine-to-machine type environment the STA is still within the more general term of user device.

Various embodiments of the computer readable MEMs 20B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the WLAN and IEEE 802.11ah system, as noted above the exemplary embodiments of this invention may be used with various other types of wireless communication systems and access technologies such as for example cognitive radio systems or cellular systems as presently in use or as adapted over time in the future to handle machine to machine type communications.

Further, some of the various features of the above non-limiting embodiments may be used to advantage without the corresponding use of other described features. Additionally, the nomenclature used in the above description for certain messages, and/or fields and/or informational elements of such messages, are not limiting but rather are provided to give the reader a clearer appreciation of the teachings herein. The foregoing description should therefore be considered as merely illustrative of the principles, teachings and exemplary embodiments of this invention, and not in limitation thereof.

We claim:

1. A method comprising:
utilizing at a first access node of a first network code sequences assigned to different user devices to distinguish at least acknowledgements from the user devices that are received in parallel or sequentially;
determining from signaling received at the first access node of the first network that a root sequence of the code sequences is in use by a second access node of a second network, wherein the signaling comprises uplink signaling received from at least one of the user devices reporting a root sequence currently in use by the second access node in the second network; and thereafter
changing the root sequence of the code sequences assigned to the different user devices.

2. The method according to claim 1, in which:
the first access node and the second access node are each access points of the respective first and second networks which are wireless local area networks;
the user devices are stations attached to the first access point; and
the acknowledgements from the stations are received in response to the first access point sending to the stations a group poll.

3. The method according to claim 1, in which the signaling comprises a contention free group poll.

4. The method according to claim 1, in which the uplink signaling is received in response to the first access node sending to the at least one of the user device a request for the uplink signaling.

5. The method according to claim 1, in which changing the root sequence comprises transmitting an indication of a new root sequence to the different user devices.

6. An apparatus comprising:
at least one processor; and
at least one memory including computer program code, in which the at least one memory and the computer program code are configured, with the at least one processor and in response to execution of the computer program code, to cause the apparatus to perform at least:
utilizing at a first access node of a first network code sequences assigned to different user devices to distinguish at least acknowledgements from the user devices that are received in parallel or sequentially;
determining from signaling received at the first access node of the first network that a root sequence of the code sequences is in use by a second access node of a second network, wherein the signaling comprises uplink signaling received from at least one of the user devices reporting a root sequence currently in use by the second access node in the second network; and thereafter
changing the root sequence of the code sequences assigned to the different user devices.

7. The apparatus according to claim 6, in which:
the apparatus comprises the first access node or one or more components thereof;
the first access node and the second access node are each access points of the respective first and second networks which are wireless local area networks;
the user devices are stations attached to the first access point; and
the acknowledgements from the stations are received in response to the first access point sending to the stations a group poll.

8. The apparatus according to claim 6, in which the signaling comprises a contention free group poll.

9. The apparatus according to claim 6, in which the uplink signaling is received in response to the first access node sending to the at least one of the user device a request for the uplink signaling.

10. The apparatus according to claim 6, in which changing the root sequence comprises transmitting an indication of a new root sequence to the different user devices.

11. A computer readable memory storing a program of instructions which when executed by at least one processor result in actions comprising:
utilizing at a first access node of a first network code sequences assigned to different user devices to distinguish at least acknowledgements from the user devices that are received in parallel or sequentially;
determining from signaling received at the first access node of the first network that a root sequence of the code sequences is in use by a second access node of a second network, wherein the signaling comprises uplink signaling received from at least one of the user devices reporting a root sequence currently in use by the second access node in the second network; and thereafter
changing the root sequence of the code sequences assigned to the different user devices.

12. The computer readable memory according to claim 11, in which:
the first access node and the second access node are each access points of the respective first and second networks which are wireless local area networks;
the user devices are stations attached to the first access point; and
the acknowledgements from the stations are received in response to the first access point sending to the stations a group poll.

13. The computer readable memory according to claim 11, in which the signaling comprises a contention free group poll.

14. The computer readable memory according to claim 11, in which the uplink signaling is received in response to the first access node sending to the at least one of the user device a request for the uplink signaling.

15. The computer readable memory according to claim 11, in which changing the root sequence comprises transmitting an indication of a new root sequence to the different user devices.

* * * * *